(12) United States Patent
Jeon et al.

(10) Patent No.: US 11,640,800 B2
(45) Date of Patent: May 2, 2023

(54) COLOR GAMUT MAPPING METHOD AND DEVICE

(71) Applicant: LX SEMICON CO., LTD., Daejeon (KR)

(72) Inventors: Hyun Kyu Jeon, Daejeon (KR); Ji Won Lee, Daejeon (KR); Ji Hong Yuk, Daejeon (KR); Chang Young Bae, Daejeon (KR); Seul Gi Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/453,375

(22) Filed: Nov. 3, 2021

(65) Prior Publication Data
US 2022/0139343 A1    May 5, 2022

(30) Foreign Application Priority Data
Nov. 5, 2020   (KR) .................. 10-2020-0146960

(51) Int. Cl.
*G09G 3/34* (2006.01)
*G09G 3/36* (2006.01)
*G09G 5/10* (2006.01)

(52) U.S. Cl.
CPC ......... *G09G 3/3413* (2013.01); *G09G 3/3607* (2013.01); *G09G 5/10* (2013.01); *G09G 2320/0666* (2013.01); *G09G 2340/06* (2013.01)

(58) Field of Classification Search
CPC ...... G09G 3/3413; G09G 3/3607; G09G 5/10; G09G 2320/0666; G09G 2340/06; G09G 5/02; H04N 1/6058; H04N 9/64
See application file for complete search history.

(56) References Cited

U.S. PATENT DOCUMENTS

| 8,421,925 | B2  | 4/2013  | Su et al. |
| 9,355,603 | B2  | 5/2016  | Chu Ke et al. |
| 9,818,047 | B1* | 11/2017 | Li ............... H04N 9/68 |

(Continued)

FOREIGN PATENT DOCUMENTS

KR    10-2015-0081153 A    7/2015

*Primary Examiner* — Sahlu Okebato
(74) *Attorney, Agent, or Firm* — Harness, Dickey & Pierce, P.L.C.

(57) ABSTRACT

The present disclosure relates to a color gamut mapping method and a color gamut mapping device that allow precise color gamut tuning to be efficiently performed, and a display device including the same. A color gamut mapping method according to an aspect includes converting, by a color space converter, a first color signal of an input image into a first luminance component and a pair of first chrominance components, controlling, by a saturation controller, a saturation of the first chrominance component for each control area using a saturation gain and outputting a second chrominance component, controlling, by a hue controller, a hue of the second chrominance component for each control area and outputting a third chrominance component, entirely controlling, by an overall controller, a saturation and a hue of the third chrominance component using overall saturation gains and overall hue gains and outputting a fourth chrominance component, and inversely converting.

16 Claims, 7 Drawing Sheets

(56) References Cited

U.S. PATENT DOCUMENTS

| | | | | |
|---|---|---|---|---|
| 2013/0286040 A1* | 10/2013 | Kawaguchi | .............. | G09G 5/06 |
| | | | | 345/601 |
| 2014/0002480 A1* | 1/2014 | Bhaskaran | ............... | G09G 5/02 |
| | | | | 345/590 |
| 2015/0070404 A1* | 3/2015 | Chu Ke | ............... | G09G 3/3607 |
| | | | | 345/88 |
| 2020/0286210 A1 | 9/2020 | Hsiao et al. | | |

* cited by examiner

COLOR GAMUT MAPPING METHOD AND DEVICE

CROSS-REFERENCE TO RELATED APPLICATIONS

This application claims the benefit of the Korean Patent Application No. 10-2020-0146960 filed on Nov. 5, 2020, which are hereby incorporated by reference as if fully set forth herein.

FIELD

The present disclosure relates to a color gamut mapping method and a color gamut mapping device that allow precise color gamut tuning to be efficiently performed.

BACKGROUND

As display devices are being developed toward high resolution and high definition, color reproducibility thereof has been improved. Since a color reproduction area that can be expressed by a display device, that is, a color gamut, varies depending on the characteristics of the display device, a color gamut mapping process for compressing a color gamut of an input image according to the characteristics of the display device or for extending the color gamut is required.

For example, when a standard red/green/blue (sRGB) image, which is a standard for high-definition television (HDTV), is displayed on a liquid crystal display device or an organic light-emitting diode display device having a color gamut wider than that of sRGB, a color gamut mapping process for extending the color gamut of the sRGB to the wide color gamut of the corresponding display device is required.

Such a color gamut mapping process requires an efficient color gamut tuning method that is capable of reducing time and control signals while requiring precise color gamut tuning in order to improve image quality.

SUMMARY

The present disclosure is directed to providing a color gamut mapping method and a color gamut mapping device that allow precise color gamut tuning to be efficiently performed.

One aspect of the present disclosure provides a color gamut mapping method including converting, by a color space converter, a first color signal of an input image into a first luminance component and a pair of first chrominance components and outputting the first luminance component and the pair of first chrominance components, calculating and outputting, by a hue calculator, a hue angle using the first chrominance components, selecting and outputting, by a hue axis selection unit, hue axes of a corresponding control area in which the calculated hue angle is located among a plurality of control areas divided by a plurality of hue axes having different hue angles, calculating and outputting, by a parameter calculator, a plurality of parameters including a plurality of saturation gains and a plurality of hue gains using a plurality of parameters that are set to correspond to the selected hue axes and using the calculated hue angle, controlling, by a saturation controller, a saturation of the first chrominance component for each control area using the calculated saturation gain and outputting a second chrominance component, controlling, by a hue controller, a hue of the second chrominance component for each control area using the calculated hue gain and outputting a third chrominance component, entirely controlling, by an overall controller, a saturation and a hue of the third chrominance component using overall saturation gains and overall hue gains and outputting a fourth chrominance component, and inversely converting, by a color space inverse converter, the fourth chrominance component and the first luminance component into a second color signal and outputting the second color signal.

Another aspect of the present disclosure provides a color gamut mapping device including a color space converter configured to convert a first color signal of an input image into a first luminance component and a pair of first chrominance components and output the first luminance component and the pair of first chrominance components, a hue calculator configured to calculate and output a hue angle using the first chrominance components, a hue axis selection unit configured to select and output hue axes of a corresponding control area in which the calculated hue angle is located among a plurality of control areas divided by a plurality of hue axes having different hue angles, a parameter calculator configured to calculate and output a plurality of parameters including a plurality of saturation gains and a plurality of hue gains using a plurality of parameters that are set to correspond to the selected hue axes and using the calculated hue angle, a saturation controller configured to control a saturation of the first chrominance component for each control area using the calculated saturation gains and output a second chrominance component, a hue controller configured to control a hue of the second chrominance component for each control area using the calculated hue gains and output a third chrominance component, an overall controller configured to entirely control a saturation and a hue of the third chrominance component using overall saturation gains and overall hue gains and output a fourth chrominance component, and a color space inverse converter configured to inversely convert the fourth chrominance component and the first luminance component into a second color signal and output the second color signal.

The parameter calculator may calculate the plurality of saturation gains corresponding to a plurality of saturation control areas that are divided by a plurality of saturation control points having different saturation values in the corresponding control area and may calculate the plurality of hue gains corresponding to a plurality of hue control areas that are divided by a saturation value of a hue control point in the corresponding control area. The plurality of saturation gains may include a first saturation gain, a second saturation gain, and a third saturation gain that are calculated to respectively correspond to a first saturation control area, a second saturation control area, and a third saturation control area divided by first and second saturation control points. The plurality of hue gains may include a first hue gain and a second hue gain that are calculated to respectively correspond to a first hue control area and a second hue control area divided by the hue control point.

The parameter calculator may linearly interpolate first to third saturation parameters of a first hue axis, which are set for each of the first to third saturation control areas to correspond to the first hue axis of the corresponding control area, and first to third saturation parameters of a second hue axis, which are set for each of the first to third saturation control areas to correspond to the second hue axis of the corresponding control area, for each of the first to third saturation control areas according to the calculated hue angle to calculate the first to third saturation gains and may linearly interpolate first and second hue parameters of the first hue axis, which are set for each of the first and second hue control areas to correspond to the first hue axis of the corresponding control area, and first and second hue parameters of the second hue axis, which are set for each of the first and second hue control areas to correspond to the second hue axis of the corresponding control area, for each of the first and second hue control areas according to the calculated hue angle to calculate the first and second hue gains.

The saturation controller may control the saturation of the first chrominance component by applying at least one of the first to third saturation gains corresponding to the first to third saturation control areas to the first chrominance component according to a result of comparing a saturation value of the first chrominance component to the first to third saturation control points. When the saturation value of the first chrominance component is less than or equal to a first saturation control point, the saturation controller may control the saturation of the first chrominance component by applying the first saturation gain to the first chrominance component. When the saturation value of the first chrominance component is greater than the first saturation control point and is less than or equal to the second saturation control point, the saturation controller may control the saturation of the first chrominance component by dividing the saturation value of the first chrominance component into a first saturation value and a second saturation value to respectively correspond to the first saturation control area and the second saturation control area using the first saturation control point and summing a value obtained by applying the first saturation gain to the first saturation value and a value obtained by applying the second saturation gain to the second saturation value. When the saturation value of the first chrominance component is greater than the second saturation control point, the saturation controller may control the saturation of the first chrominance component by dividing the saturation value of the first chrominance component into a first saturation value, a second saturation value, and a third saturation value to respectively correspond to the first saturation control area, the second saturation control area, and the third saturation control area using the first and second saturation control points and summing all of a value obtained by applying the first saturation gain to the first saturation value, a value obtained by applying the second saturation gain to the second saturation value, and a value obtained by applying the third saturation gain to the third saturation value.

The hue controller may control the hue of the second chrominance component by applying any one of the first and second hue gains corresponding to the first and second hue control areas to the second chrominance component according to a result of comparing a saturation value of the second chrominance component to the hue control point. When the saturation value of the second chrominance component is less than or equal to the hue control point, the hue controller may control the hue of the second chrominance component by applying the first saturation gain to the second chrominance component, or when the saturation value of the second chrominance component is greater than the hue control point, the hue controller may control the hue of the second chrominance component by applying the second saturation gain to the second chrominance component.

The overall controller may entirely control the saturation of the third chrominance component by applying the overall saturation gains to the third chrominance component and may entirely control the hue of the third chrominance component whose saturation is entirely controlled by applying the overall hue gains to the third chrominance component whose saturation is entirely controlled.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
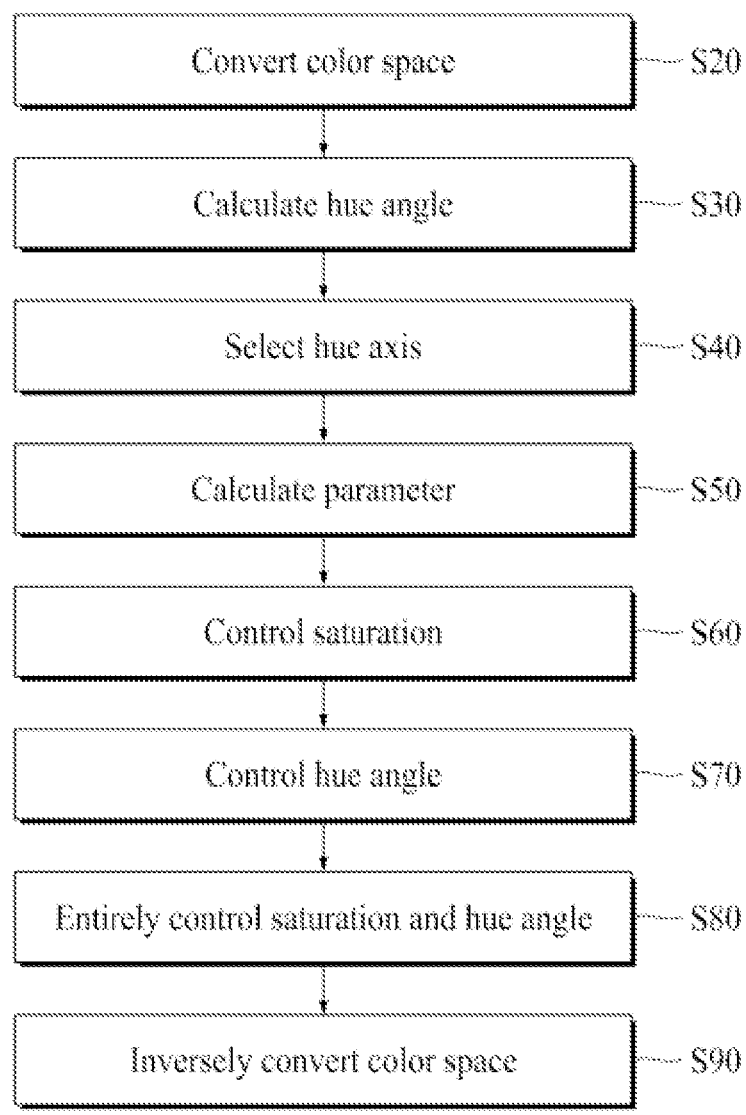
FIG. 1 is a flowchart illustrating a color gamut mapping method according to an embodiment.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only-' is used. The terms of a singular form may include plural forms unless referred to the contrary.

In construing an element, the element is construed as including an error range although there is no explicit description.

In describing a position relationship, for example, when a position relation between two parts is described as "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case which is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, the terms "first," "second," "A," "B," "(a)," "(b)," etc., may be used. These terms are intended to identify the corresponding elements from the other elements, and basis, order, or number of the corresponding elements should not be limited by these terms. The expression that an element is "connected," "coupled," or "adhered" to another element or layer, the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more among the associated listed elements. For example, the meaning of "at least one or more of a first element, a second element, and a third element" denotes the combination of all elements proposed from two or more of the first element, the second element, and the third element as well as the first element, the second element, or the third element.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

As used herein, the term "unit" refers to software or a hardware component such as a field-programmable gate array (FPGA) or an application-specific integrated circuit (ASIC), and the "unit" performs certain functions. However, the "unit" is not limited to software or hardware. The "unit" may be configured to be stored in a storage medium that may be addressed or may be configured to be executed by one or more processors. Therefore, the "unit" includes, for example, software components, processes, functions, drivers, firmware, circuits, data, database, and tables.

Hereinafter, exemplary embodiments of the present disclosure will be described in detail with reference to the accompanying drawings.

Figure 2:
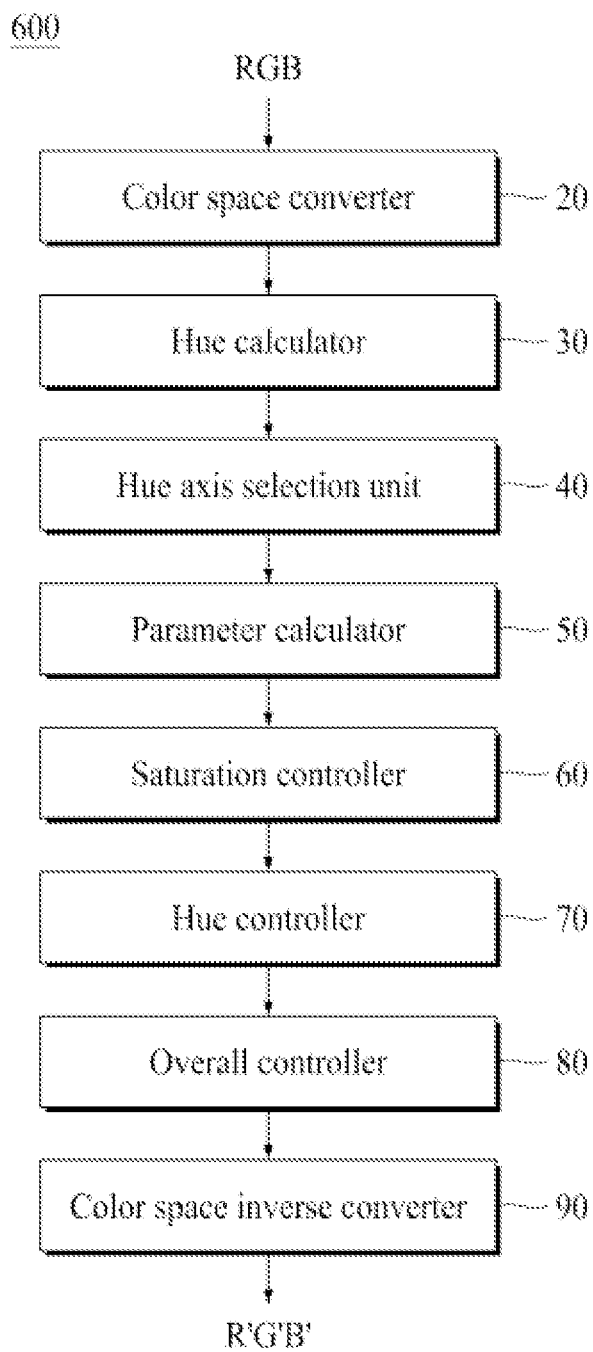
FIG. 2 is a block diagram illustrating a color gamut mapping device according to an embodiment.

FIG. 1 is a flowchart illustrating a color gamut mapping method according to an embodiment of the present disclosure, and FIG. 2 is a block diagram illustrating a color gamut mapping device according to the embodiment of the present disclosure.

The color gamut mapping method illustrated in FIG. 1 may include an operation S20 of converting a color space, an operation S30 of calculating a hue angle, an operation S40 of selecting a hue axis, an operation S50 of calculating a parameter, an operation S60 of controlling a saturation, an operation S70 of controlling a hue angle, an operation S80 of entirely controlling a saturation and a hue angle, and an operation S20 of inversely converting a color space.

A color gamut mapping device 600 illustrated in FIG. 2 may include a color space converter 20, a hue calculator 30, a hue axis selection unit 40, a parameter calculator 50, a saturation controller 60, a hue controller 70, an overall controller 80, and a color space inverse converter 90.

Referring to FIGS. 1 and 2, the color space converter 20 may receive red(R), green (G), and blue (B) signals from a preprocessor 10 and convert the R, G, and B signals into YCbCr type image signals (hereinafter referred to as Y, Cb, and Cr signals) each representing a luminance component Y, a chrominance component Cb, and a chrominance component Cr (S20).

For example, the color space converter 20 may convert the R, G, and B signals into the Y, Cb, and Cr signals by using an RGB-to-YCbCr conversion function in which conversion coefficients (in International Telecommunication Union (ITU)-R Recommendation BT.2020) are applied as shown in Equation 1 below. The conversion coefficients applied to Equation 1 below may be changed.

$$Y = 0.267 \times R + 0.678 \times G + 0.0593 \times B$$

$$Cb = -0.1396 \times R - 0.3603 \times G + 0.5 \times B$$

$$Cr = 0.5 \times R - 0.459 \times G - 0.0402 \times B \quad \text{[Equation 1]}$$

In other words, the color space converter 20 may divide the R, G, and B signals into a luminance signal Y representing luminance information and chrominance signals Cb and Cr representing color information. The color space converter 20 may output the Y, Cb, and Cr signals to the hue calculator 30.

The hue calculator 30 may calculate a hue angle representing a hue value using the chrominance signals Cb and Cr among the image signals Y, Cb, and Cr supplied from the color space converter 20 (S30).

Figure 3:
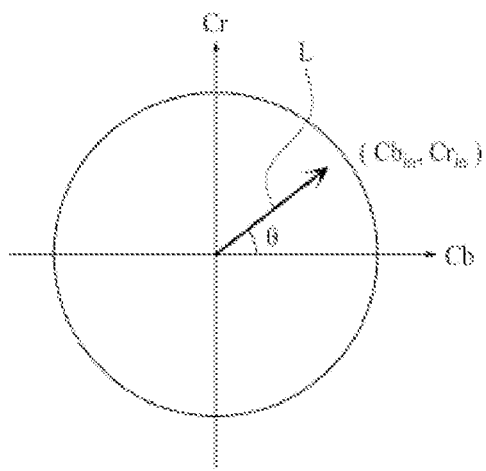
FIG. 3 is a diagram illustrating an example of a hue angle of chrominance components (Cb, Cr) according to an embodiment.

Referring to FIG. 3, a hue angle $\theta$ with respect to input Cb and Cr coordinates ($Cb_{in}$, $Cr_{in}$) on a Cb-Cr plane refers to an angle between a Cb axis and a straight line L connecting the corresponding Cb and Cr coordinates ($Cb_{in}$, $Cr_{in}$) from the origin. The hue calculator 30 may calculate the hue angle $\theta$ with respect to the input Cb and Cr coordinates ($Cb_{in}$, $Cr_{in}$) using an arc tangent function (a tan) of the Cb and Cr coordinates ($Cb_{in}$, $Cr_{in}$) as shown in Equation 2 below.

$$\text{Hue}(=\theta) = a\tan(Cbin, Crin) \quad \text{[Equation 2]}$$

The hue calculator 30 may output the image signals Y, Cb, and Cr supplied from the color space converter 20 and the calculated hue angle to the hue axis selection unit 40.

The hue axis selection unit 40 may select hue axes of an area in which the hue angle is located using the hue angle supplied from the hue calculator 30 (S40).

Figure 4:
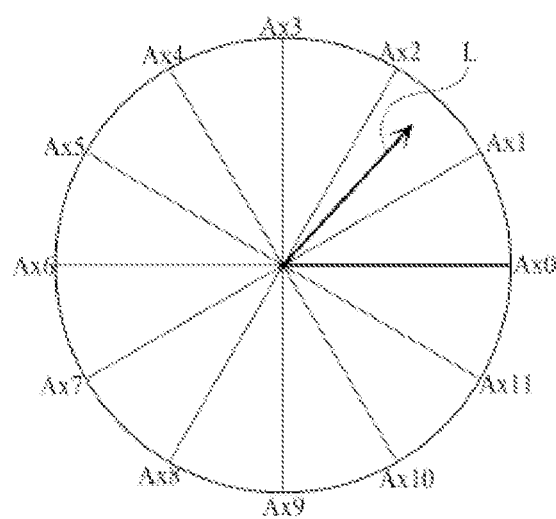
FIG. 4 is a diagram illustrating hue axes in a circular color area according to an embodiment.

For example, twelve hue axes Ax0 to Ax11 located at 30 degrees of intervals may be assigned in a circular color area on the Cb-Cr plane shown in FIG. 4, and the circular color area may be divided into twelve areas by the twelve hue axes Ax0 to Ax11.

The hue axis selection unit 40 may select a first hue axis Ax1 and a second hue axis Ax2 in an area in which the supplied hue angle is located among the twelve hue axes Ax0 to Ax11. The second hue axis may have a greater hue angle than the first hue axis.

For example, as shown in FIG. 4, when a hue angle $\theta$ calculated by the hue calculator 30, that is, a straight line L of the input Cb, Cr coordinates, is located in an area between a first hue axis Ax1 and a second hue axis Ax2, the hue axis selection unit 40 may select the first hue axis Ax1 and the second hue axis Ax2 in the corresponding area.

The hue axis selection unit 40 may output the image signals Y, Cb, and Cr and the hue angle, which are supplied from the hue calculator 30, and two hue axes, which are selected to correspond to the hue angle, to the parameter calculator 50.

The parameter calculator 50 may calculate a plurality of parameters using the two hue axes supplied from the hue axis selection unit 40 and the hue angle (S50). The parameter calculator 50 may calculate a plurality of parameters using the parameters that are set to correspond to the two hue axes supplied from the hue axis selection unit 40 and using the supplied hue angle.

The parameters calculated by the parameter calculator 50 may include saturation parameters for saturation control and hue parameters for hue control.

The circular color area on the Cb-Cr plane may be divided into a plurality of control areas by a plurality of hue axes according to the hue angle, and the hue, the saturation, and the luminance may be independently adjusted in each control area using the parameters individually assigned to each of the plurality of hue axes. Further, each of the control areas divided by the hue axes may be further divided into a plurality of saturation control areas in order to control the saturation differently according to a saturation value. Furthermore, each of the control areas divided by the hue axes may be further divided into a plurality of hue control areas in order to control the hue differently according to the saturation value.

Figure 5:
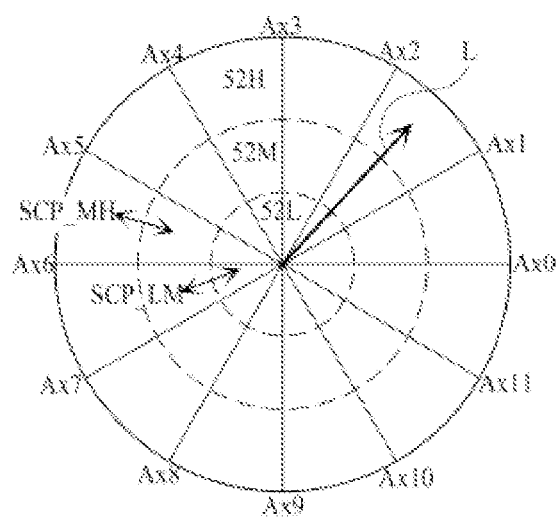
FIG. 5 is a diagram illustrating saturation control areas in a circular color area according to an embodiment.
Figure 6:
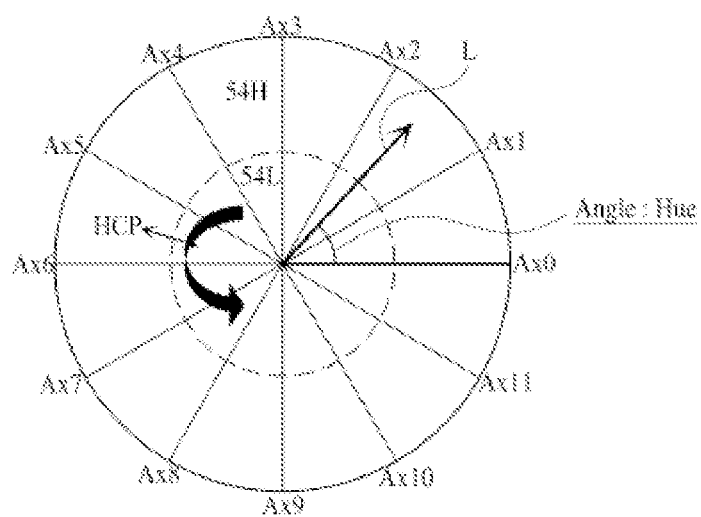
FIG. 6 is a diagram illustrating hue control areas in a circular color area according to an embodiment.

For example, as shown in FIGS. 5 and 6, the circular color area on the Cb-Cr plane may be divided into twelve control areas by twelve hue axes Ax0 to Ax11 according to a hue angle. As shown in FIG. 5, each of the control areas divided by the hue axes Ax0 to Ax11 may be further divided into first to third saturation control areas 52L, 52M, and 52H according to the saturation value corresponding to a length of a straight line L from the origin. Further, as shown in FIG. 6, each of the control areas divided by the hue axes Ax0 to Ax11 may be further divided into first and second hue control areas 54L and 54H according to the saturation value.

In a register used by the parameter calculator 50, a first saturation control point SCP_LM, a second saturation control point SCP_MH, and a hue control point HCP, which are preset, are stored. The first saturation control point SCP_LM refers to a saturation value that distinguishes the first saturation control area 52L corresponding to a low saturation area from the second saturation control area 52M corresponding to an intermediate saturation area. The second saturation control point SCP_MH refers to a saturation value that separates the second saturation control area 52M from the third saturation control area 52H corresponding to a high saturation area. The hue control point HCP refers to a saturation value that distinguishes the first hue control area 54L corresponding to a low saturation area for hue control from the second hue control area 54H corresponding to a high saturation area for hue control. The first saturation control point SCP_LM, the second saturation control point SCP_MH, and the hue control point HCP may be adjustable by a designer according to display characteristics.

The parameters, which are each set to correspond to one hue axis and are stored in registers, may include a first saturation parameter corresponding to the first saturation control area 52L, a second saturation parameter corresponding to the second saturation control area 52M, a third saturation parameter corresponding to the third saturation control area 52H, a first hue parameter corresponding to the first hue control area 54L, and a second hue parameter corresponding to the second hue control area 54H.

Figure 7:
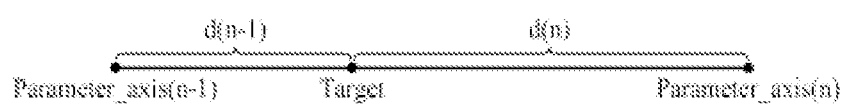
FIG. 7 is a diagram for describing a method of calculating parameters performed by a parameter calculator according to an embodiment.

Referring to FIG. 7, the parameter calculator 50 may linearly interpolate a parameter (gain) Parameter_axis(n−1) of a first hue axis Ax(n−1) (n is a positive integer) and a parameter Parameter_axis(n) of a second hue axis Ax(n) using angle differences d(n−1) and d(n) between a supplied hue angle Target and a corresponding hue axis as shown in Equation 3 below to calculate a result parameter Parameter_result for controlling the supplied Cb and Cr signals and hue angle as a gain.

$$\text{Parameter\_result} = d(n-1) \times \text{Parameter\_axis}(n) + d(n) \times \text{Parameter\_axis}(n-1) \qquad \text{[Equation 3]}$$

In Equation 3 above, Parameter_axis(n−1) denotes the parameter set to the first hue axis Ax(n−1) and Parameter_axis(n) denotes the parameter set to the second hue axis Ax(n). d(n−1) denotes the angle difference between the supplied hue angle Target and the first hue axis Ax(n−1) and d(n) denotes the angle difference between the second hue axis Ax(n) and the supplied hue angle Target. The parameters of each hue axis may include saturation parameters and hue parameters.

For example, the parameter calculator 50 may linearly interpolate a first saturation parameter set to the first hue axis Ax(n−1) and a first saturation parameter set to the second hue axis Ax(n) as shown in Equation 3 above to calculate a first saturation gain to be applied to the supplied Cb and Cr signals. The parameter calculator 50 may linearly interpolate a second saturation parameter set to the first hue axis Ax(n−1) and a second saturation parameter set to the second hue axis Ax(n) as shown in Equation 3 above to calculate a second saturation gain to be applied to the supplied Cb and Cr signals. The parameter calculator 50 may linearly interpolate a third saturation parameter set to the first hue axis Ax(n−1) and a third saturation parameter set to the second hue axis Ax(n) as shown in Equation 3 above to calculate a third saturation gain to be applied to the supplied Cb and Cr signals.

The parameter calculator 50 may linearly interpolate a first hue parameter set to the first hue axis Ax(n−1) and a first hue parameter set to the second hue axis Ax(n) as shown in Equation 3 above to calculate a first hue gain to be applied to the supplied hue angle. The parameter calculator 50 may linearly interpolate a second hue parameter set to the first hue axis Ax(n−1) and a second hue parameter set to the second hue axis Ax(n) as shown in Equation 3 above to calculate a second hue gain to be applied to the supplied hue angle.

The parameter calculator 50 may output the image signals Y, Cb, and Cr and the hue angle, which are supplied from the hue axis selection unit 40, and the first to third saturation gains and the first and second hue gains, which are calculated by the parameter calculator 50, to the saturation controller 60.

The saturation controller 60 may control the saturation of the chrominance signals Cb and Cr supplied from the parameter calculator 50 using at least one of the first to third saturation gains calculated by the parameter calculator 50 (S60). The saturation controller 60 may determine a saturation control area, in which the supplied chrominance signals Cb and Cr are located, and apply the corresponding saturation gain for each saturation control area according to the determined saturation control area to control the saturation of the supplied chrominance signals Cb and Cr.

The saturation controller 60 calculates a saturation value Sat of the supplied chrominance signals Cb and Cr, that is, a saturation value Sat corresponding to a length of a straight line to the coordinates of the chrominance signals Cb and Cr from the origin, as shown in Equation 4 below.

$$Sat=\sqrt{Cb^2+Cr^2} \quad \text{[Equation 4]}$$

The saturation controller 60 may determine which area the chrominance signals Cb and Cr are located in among the first to third saturation control areas by comparing the saturation value of the chrominance signals Cb and Cr to the first and second saturation control points SCP_LM and SCP_MH and may adjust the saturation of the supplied chrominance signals Cb and Cr by applying the corresponding saturation gain among the first to third saturation gains to the determined saturation control area.

Figure 8:
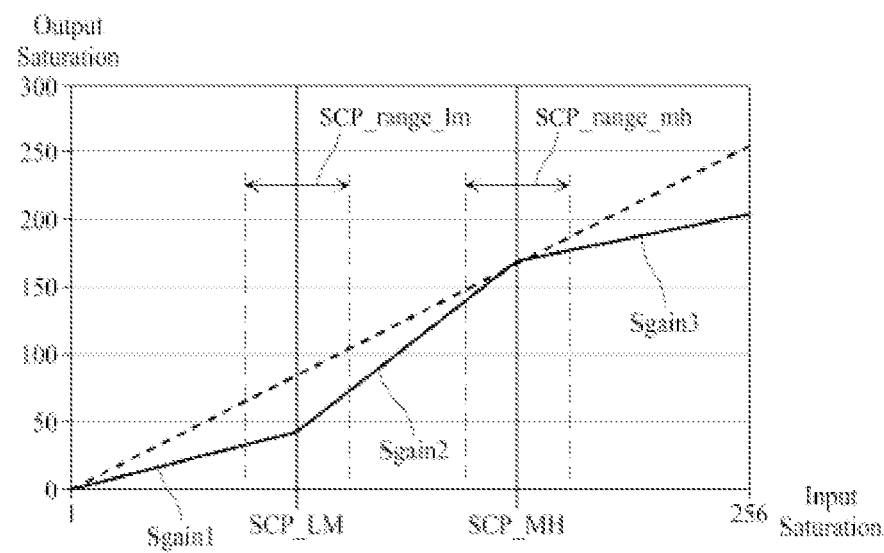
FIG. 8 is a graph showing an example of a saturation gain for each saturation control area according to an embodiment.

Referring to FIG. 8, the input saturation may be adjusted to the output saturation by applying different saturation gains Sgain1, Sgain2, and Sgain3 according to the saturation control areas divided by the first and second saturation control points SCP_LM and SCP_MH. The first saturation control point SCP_LM may vary within an adjustment range SCP_range_lm of the first saturation control point, and the second saturation control point SCP_MH may vary within an adjustment range SCP_range_mh of the second saturation control point.

When the saturation value of the supplied chrominance signals Cb and Cr is less than or equal to the first saturation control point SCP_LM, the saturation controller 60 may determine that the chrominance signals Cb and Cr are located in the first saturation control area 52L (see FIG. 5) and may control the saturation of the supplied chrominance signals Cb and Cr by applying (multiplying) the first saturation gain Sgain1 of the first saturation control area 52L to (and) the supplied chrominance signals Cb and Cr.

When the saturation value of the supplied chrominance signals Cb and Cr is greater than the first saturation control point SCP_LM and is less than or equal to the second saturation control point SCP_MH, the saturation controller 60 may determine that the chrominance signals Cb and Cr are located in the second saturation control area 52M (see FIG. 5) and may control the saturation of the supplied chrominance signals Cb and Cr by summing a value obtained by applying (multiplying) the first saturation gain Sgain1 of the first saturation control area 52L to (and) the supplied chrominance signals Cb and Cr for each saturation control area and a value obtained by applying (multiplying) the second saturation gain Sgain2 of the second saturation control area 52M to (and) the supplied chrominance signals Cb and for each saturation control area.

For example, the saturation controller 60 may divide the saturation value Sat of the chrominance signals Cb and Cr located in the second saturation control area 52M (see FIG. 5) into a first saturation value SCP_LM of the first saturation control area 52L and a second saturation value (Sat-SCP_LM) of the second saturation control area 52M. Here, the first saturation value SCP_LM of the first saturation control area 52L is identical to the first saturation control point SCP_LM, and the second saturation value (Sat-SCP_LM) of the second saturation control area 52M refers to a value obtained by subtracting the first saturation control point SCP_LM from the saturation value Sat of the chrominance signals Cb and Cr.

The saturation controller 60 may precisely control and output the saturation of the chrominance signals Cb and Cr for each saturation control area by summing a value obtained by applying (multiplying) the first saturation gain Sgain1 of the first saturation control area 52L to (and) the first saturation value SCP_LM of the first saturation control area 52L and a value obtained by applying (multiplying) the second saturation gain Sgain2 of the second saturation control area 52M to (and) the second saturation value (Sat-SCP_LM) of the second saturation control area 52M.

When the saturation value of the supplied chrominance signals Cb and Cr is greater than the second saturation control point SCP_MH, the saturation controller 60 may determine that the chrominance signals Cb and Cr are located in the third saturation control area 52H (see FIG. 5) and may control the saturation of the supplied chrominance signals Cb and Cr for each saturation control area by summing a value obtained by applying (multiplying) the first saturation gain Sgain1 of the first saturation control area 52L to (and) the supplied chrominance signals Cb and Cr, a value obtained by applying (multiplying) the second saturation gain Sgain2 of the second saturation control area 52M to (and) the supplied chrominance signals Cb and Cr, and a value obtained by applying (multiplying) the third saturation gain Sgain3 of the third saturation control area 52H to (and) the supplied chrominance signals Cb and Cr.

The saturation controller 60 may divide the saturation value Sat of the chrominance signals Cb and Cr located in the third saturation control area 52H into a first saturation value SCP_LM of the first saturation control area 52L, a second saturation value (SCP_MH-SCP_LM) of the second saturation control area 52M, and a third saturation value (Sat-SCP_MH) of the third saturation control area 52H. Here, the first saturation value SCP_LM of the first saturation control area 52L is identical to the first saturation control point SCP_LM, the second saturation value (SCP_MH-SCP_LM) of the second saturation control area 52M refers to a value obtained by subtracting the first saturation control point SCP_LM from the second saturation control point SCP_MH, and the third saturation value (Sat-SCP_MH) of the third saturation control area 52H refers to a value obtained by subtracting the second saturation control point SCP_MH from the saturation value Sat of the chrominance signals Cb and Cr.

The saturation controller 60 may precisely control and output the saturation of the chrominance signals Cb and Cr for each saturation control area by summing all of the value obtained by applying (multiplying) the first saturation gain Sgain1 of the first saturation control area 52L to (and) the first saturation value SCP_LM of the first saturation control area 52L, the value obtained by applying (multiplying) the second saturation gain Sgain2 of the second saturation control area 52M to (and) the second saturation value (SCP_MH-SCP_LM) of the second saturation control area 52M, and the value obtained by applying (multiplying) the third saturation gain Sgain3 of the third saturation control area 52H to (and) the third saturation value (Sat-SCP_MH) of the third saturation control area 52H.

The saturation controller 60 may output the Y signal and the first and second hue gains, which are supplied from the parameter calculator 50, the Cb and Cr signals whose saturation is adjusted by the saturation controller 60, and the saturation value, which is calculated by the saturation controller 60, to the hue controller 70.

The hue controller 70 may control the hue of the Cb and Cr signals supplied from the saturation controller 60 using any one of the first and second hue gains according to the saturation value supplied from the saturation controller 60 (S70).

The hue controller 70 may determine the hue control area by comparing the saturation value supplied from the saturation controller 60 to the hue control point HCP and may control the hue of the Cb and Cr signals supplied from the saturation controller 60 by applying the hue gain of the determined hue control area to the Cb and Cr signals supplied from the saturation controller 60.

For example, when the saturation value supplied from the saturation controller 60 is less than or equal to the hue control point HCP, the hue controller 70 may determine that the chrominance signals Cb and Cr are located in the first hue control area 54L (see FIG. 7), may select a first hue gain of the first hue control area 54L supplied from the saturation controller 60, and adjust the hue of the Cb and Cr signals by applying the selected first hue gain to the Cb and Cr signals supplied from the saturation controller 60.

When the saturation value supplied from the saturation controller 60 is greater than the hue control point HCP, the hue controller 70 may determine that the chrominance signals Cb and Cr are located in the second hue control area 54H (see FIG. 7), may select a second hue gain of the second hue control area 54H supplied from the saturation controller 60, and adjust the hue of the Cb and Cr signals by applying the selected second hue gain to the Cb and Cr signals supplied from the saturation controller 60.

Figure 9:
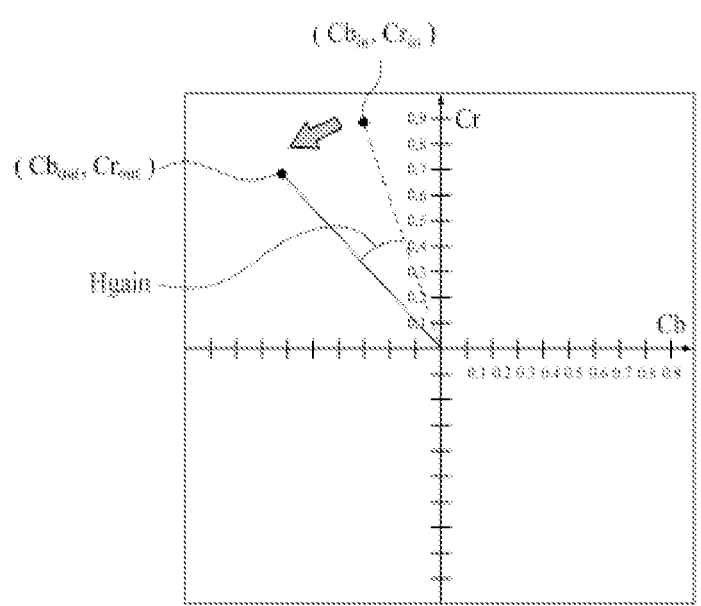
FIG. 9 is a diagram illustrating a method of controlling a hue according to an embodiment.

Referring to FIG. 9, the hue controller 70 may rotate supplied Cb and Cr signals $Cb_{in}$ and $Cr_{in}$ by a hue control gain $H_{gain}$ by applying the hue control gain $H_{gain}$ selected according to the supplied saturation value and may output Cb and Cr signals $Cb_{out}$ and $Cr_{out}$ whose hue is controlled. The hue controller 70 may apply the hue control gain $H_{gain}$ selected according to the supplied saturation value to the Cb and Cr signals $Cb_{in}$ and $Cr_{in}$ supplied from the saturation controller 60 as shown in Equation 5 below, and may output the Cb and Cr signals $Cb_{out}$ and $Cr_{out}$ whose hue is controlled.

$$Cb_{out}=Cb_{in}\times\cos(H_{gain})+Cr_{in}\times\sin(H_{gain})$$

$$Cr_{out}=-Cb_{in}\times\sin(H_{gain})+Cr_{in}\times\cos(H_{gain}) \quad [\text{Equation 5}]$$

The hue controller 70 may output the Y signal supplied from the saturation controller 60 and the Cb and Cr signals whose saturation and hue are adjusted in the corresponding control area by the saturation controller 60 and the hue controller 70 to the overall controller 80.

The overall controller 80 may additionally control the saturation and hue of the image signals Y, Cb, and Cr supplied from the hue controller 70 without dividing the control area (S80).

To this end, overall parameters for entirely controlling all of the control areas, that is, overall saturation gains for entirely controlling saturation of all of the control areas and overall hue gains for entirely controlling the hue of all of the control areas, are preset and stored in the register.

The overall controller 80 may entirely control the saturation once more by applying (multiplying) the overall saturation gains to (and) the Cb and Cr signals supplied from the hue controller 70. The overall controller 80 may entirely control the hue once more by applying the overall hue gains to the Cb and Cr signals whose saturation is controlled by applying the overall saturation gains, as shown in Equation 5 above.

The overall controller 80 may output the Y signal supplied from the hue controller 70 and the Cb and Cr signals whose saturation and hue are entirely and further adjusted by the overall controller 80 to the color space inverse converter 90.

The color space inverse converter 90 may inversely convert the Y, Cb, and Cr signals supplied from the overall controller 80 into R', G', and B' signals and may output the converted R', G', B' signals (S90).

For example, the color space inverse converter 90 may inversely convert the Y, Cb, and Cr signals into R', G', and B' signals by using a YCbCr-to-RGB conversion function in which conversion coefficients (in BT.2020) are applied as shown in Equation 6 below. The conversion coefficients applied to Equation 6 below may be changed.

$$R'=Y+1.4746\times Cr$$

$$G'=Y-0.1645\times Cb-0.5714\times Cr$$

$$B'=Y+1.8814\times Cb \quad [\text{Equation 6}]$$

As described above, in the color gamut mapping method and the color gamut mapping device 600 according to the embodiment, the input image signals may be divided into the luminance component Y and the chrominance components Cb and Cr, and the image signals mapped to the target color gamut of the corresponding display device may be output by controlling the saturation and hue of the chrominance components Cb and Cr. In the color gamut mapping device and the color gamut mapping method according to the embodiment, the color area may be divided into the plurality of control areas by the plurality of hue axes, and the hue, the saturation, and the luminance may be independently adjusted in each control area using the parameters individually assigned to each of the plurality of hue axes.

In the color gamut mapping method and the color gamut mapping device 600 according to the embodiment, each of the control areas divided by the hue axes may be further divided into the plurality of saturation control areas having different saturation gains according to the saturation value, the saturation may be precisely controlled for each saturation control area, and thus the accuracy of saturation tuning can be improved.

In the color gamut mapping method and the color gamut mapping device 600 according to the embodiment, each of the control areas divided by the hue axes may be further divided into the plurality of hue control areas having different hue gains according to the saturation value, the hue may be precisely controlled for each hue control area, and thus the accuracy of saturation tuning can be improved.

In the color gamut mapping method and the color gamut mapping device 600 according to the embodiment, by entirely controlling the chrominance components Cb and Cr whose saturation and hue are once more controlled for each control area without dividing the area by applying the overall saturation gains and the overall hue gains, the accuracy of color gamut mapping may be further improved by reducing an error range of the color gamut mapping, and a color gamut mapping time may be reduced as compared to the case of additional control for each control area, and a minimum number of control signals may be used, and thus the color gamut mapping may be efficiently processed.

The color gamut mapping device 600 according to the embodiment may be applied to a display device, and thus the color accuracy of the display device can be improved.

Figure 10:
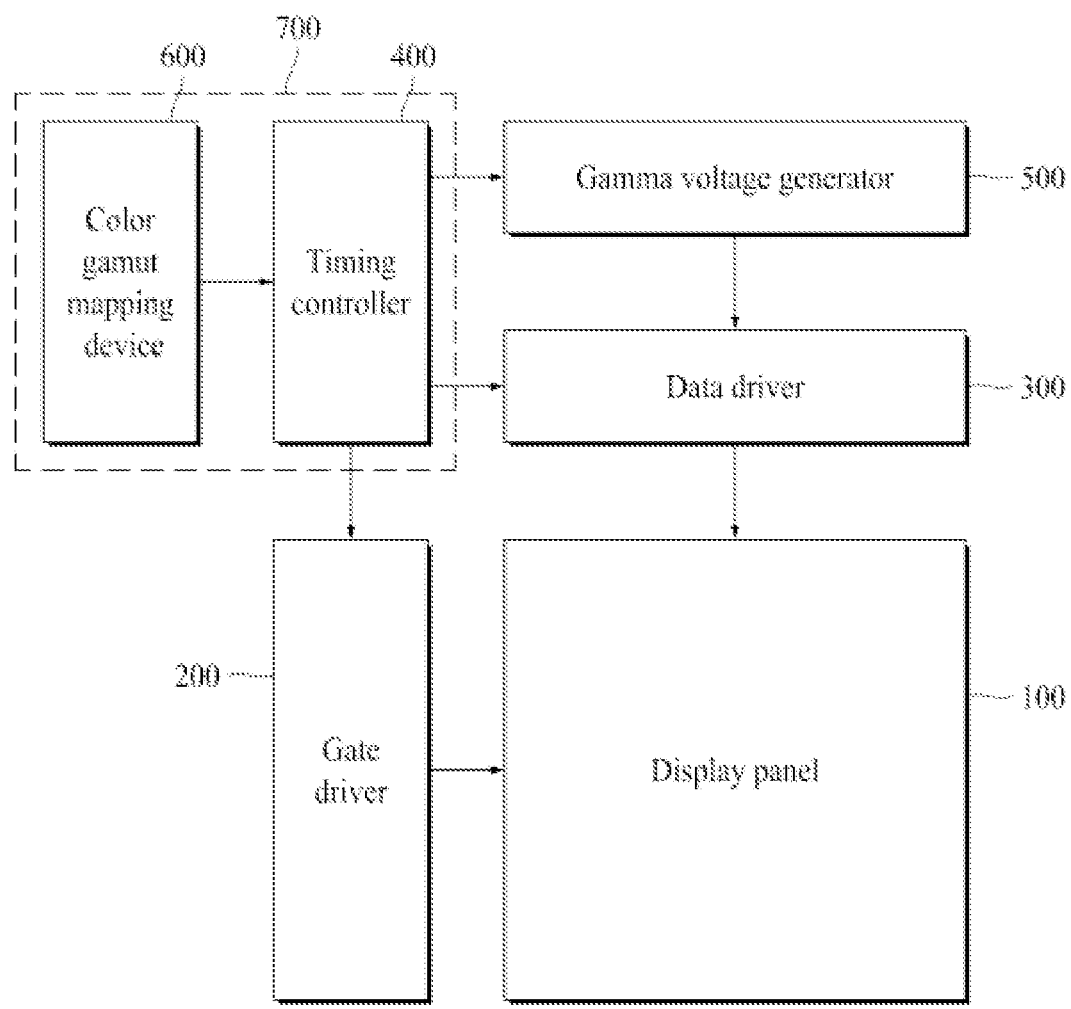
FIG. 10 is a block diagram illustrating a display device having a color gamut mapping device according to an embodiment.

FIG. 10 is a block diagram schematically illustrating a configuration of a display device to which the color gamut mapping device 600 according to the embodiment is applied.

The display device according to the embodiment may be any one of various display devices including a liquid crystal display device, an electroluminescent display device, a micro light-emitting diode (LED) display device, and the like. The electroluminescent display device may be an organic light-emitting diode (OLED) display device, a quantum dot light-emitting diode display device, or an inorganic light-emitting diode display device.

Referring to FIG. 10, the display device may include a display panel 100, a gate driver 200, a data driver 300, a gamma voltage generator 500, a timing controller 400, a color gamut mapping device 600, and the like. The color gamut mapping device 600 and the timing controller 400 may be defined as an image processor 700. The color gamut mapping device 600 may be built in the timing controller 400. The gate driver 200 and the data driver 300 may be defined as a panel driving unit. The gate driver 200, the data driver 300, and the timing controller 400 may be defined as a display driving unit.

As described above, the color gamut mapping device 600 may precisely tune hue and saturation of an input image by performing primary control on each control area and secondary control on all of the control areas, may more accurately map the input image to a target color gamut of the display device, and may output an output image mapped to the target color gamut to the timing controller 400.

The timing controller 400 may perform various types of post-processing on image data supplied from the color gamut mapping device 600, such as luminance correction or image quality correction for reducing power consumption, and may supply the post-processed image data to the data driver 300.

The timing controller 400 may receive synchronization signals together with the image data through the color gamut mapping device 600. The synchronization signals may include a dot clock, a data enable signal, a vertical synchronization signal, a horizontal synchronization signal, and the like. The timing controller 400 may generate and supply a plurality of data control signals using the supplied synchronization signals and timing setup information (start timing, the pulse width, etc.) stored therein to the data driver 300 and may generate and supply a plurality of gate control signals to the gate driver 200.

The gamma voltage generator 500 may generate and supply a reference gamma voltage set including a plurality of reference gamma voltages having different voltage levels to the data driver 300. The gamma voltage generator 500 may generate and supply a plurality of reference gamma voltages corresponding to the gamma characteristics of the display device to the data driver 300 under the control of the timing controller 400. The gamma voltage generator 500 may be configured as a programmable gamma integrated chip (IC), and the gamma voltage generator 500 may receive gamma data from the timing controller 400, generate or adjust a reference gamma voltage level according to the gamma data, and output the reference gamma voltage level to the data driver 300.

The data driver 300 is controlled according to the data control signal supplied from the timing controller 400, and the data driver 300 converts digital image data supplied from the timing controller 400 into analog data signals and supplies a corresponding data signal to each of the data lines of the display panel 100. The data driver 300 may convert the digital image data into the analog data signal using grayscale voltages in which the plurality of reference gamma voltages supplied from the gamma voltage generator 500 are subdivided.

The gate driver 200 may be controlled according to the plurality of gate control signals supplied from the timing controller 400 and may individually drive the gate lines of the display panel 100. The gate driver 200 may sequentially drive the plurality of gate lines. The gate driver 200 may supply a scan signal of a gate-on voltage to a corresponding gate line during a driving period of each gate line and may supply a gate-off voltage to the corresponding gate line during a non-driving period of each gate line.

The display panel 100 displays an image through a display area in which subpixels are arranged in a matrix form. Each subpixel is any one of a R subpixel emitting red light, a G subpixel emitting green light, a B subpixel emitting blue light, and a white (W) subpixel emitting white light and is independently driven by at least one thin-film transistor (TFT). A unit pixel may be composed of a combination of two, three, or four subpixels having different colors.

The display panel 100 may further include a touch sensor screen that senses a user's touch by entirely overlapping a display area, and the touch sensor screen may be embedded in the display panel 100 or disposed on the display area of the display panel 100.

The color gamut mapping device and the display device including the same according to the embodiment may be applied to various electronic devices. For example, the color gamut mapping device and the display device including the same according to the embodiment may be applied to a mobile device, a video phone, a smart watch, a watch phone, a wearable device, a foldable device, a rollable device, a bendable device, a flexible device, a curved device, an electronic notebook, an e-book, a portable multimedia player (PMP), a personal digital assistant (PDA), an MPEG audio layer-3 player, a mobile medical device, a desktop personal computer (PC), a laptop PC, a netbook computer, a workstation, a navigation device, a vehicle navigation device, a vehicle display device, a television, a wallpaper display device, a signage device, a game device, a notebook computer, a monitor, a camera, a camcorder, a home appliance, and the like.

The color gamut mapping device according to the embodiment may be implemented in the form of an IC. A function of the color gamut mapping device according to the embodiment may be implemented in the form of a program and mounted in an IC. The function of the color gamut mapping device according to the embodiment may be implemented as a program, functions of the components included in the color gamut mapping device may be implemented as a specific code, and code for implementing a specific function may be implemented as one program or may be implemented by being divided into a plurality of programs.

Features, structures, effects, etc. described above in various examples of the present disclosure are included in at least one example of the present disclosure and are not necessarily limited to only one example. Furthermore, features, structures, effects, etc. illustrated in at least one example of the present disclosure may be combined or modified for other examples by those skilled in the art to which the technical idea of the present disclosure pertains. Therefore, the contents related to such combinations and modifications should be interpreted as being included in the technical spirit or scope of the present disclosure.

While the present disclosure described above is not limited to the above-described embodiments and the accompanying drawings, it will be apparent to those skilled in the art to which the present disclosure belongs that various substitutions, modifications, and changes may be made herein without departing from the scope of the present disclosure. Therefore, the scope of the present disclosure is defined by the appended claims, and all changes or modifications derived from the meaning, scope, and equivalence of the claims are to be construed as being included in the scope of the present disclosure.

What is claimed is:

1. A color gamut mapping method comprising:
converting, by a color space converter, first color signals of an input image into a first luminance component and a pair of first chrominance components and outputting the first luminance component and the pair of first chrominance components, the first color signals including a first red signal, a first green signal, and a first blue signal;
calculating and outputting, by a hue calculator, a hue angle using the first chrominance components;
selecting and outputting, by a hue axis selection unit, a first hue axis and a second hue axis of a first control area in which the calculated hue angle is located among a plurality of control areas divided by a plurality of hue axes having different hue angles;
calculating and outputting, by a parameter calculator, a plurality of parameters including a plurality of saturation gains and a plurality of hue gains using a plurality of parameters that are set to correspond to the selected first and second hue axes and using the calculated hue angle;
controlling, by a saturation controller, a saturation of the first chrominance components for the first control area by applying at least one of the calculated saturation gains to the first chrominance components and outputting second chrominance components;
controlling, by a hue controller, a hue of the second chrominance components for the first control area by applying any one of the calculated hue gains to the second chrominance components and outputting third chrominance components;
supplementally controlling, by an overall controller, a saturation and a hue of the third chrominance components using overall saturation gain and overall hue gain and outputting fourth chrominance components; and
inversely converting, by a color space inverse converter, the fourth chrominance components and the first luminance component into second color signals and outputting the second color signals, the second color signals including a second red signal, a second green signal, and a second blue signal.

2. The color gamut mapping method of claim 1, wherein the calculating, by the parameter calculator, of the parameters includes:
calculating the plurality of saturation gains corresponding to a plurality of saturation control areas that are divided by a plurality of saturation control points having different saturation values in the first control area; and
calculating the plurality of hue gains corresponding to a plurality of hue control areas that are divided by a saturation value of a hue control point in the first control area.

3. The color gamut mapping method of claim 2, wherein:
the plurality of saturation gains include a first saturation gain, a second saturation gain, and a third saturation gain that are calculated to respectively correspond to a first saturation control area, a second saturation control area, and a third saturation control area of the first control area divided by first and second saturation control points; and
the plurality of hue gains include a first hue gain and a second hue gain that are calculated to respectively correspond to a first hue control area and a second hue control area of the first control area divided by the hue control point.

4. The color gamut mapping method of claim 3, wherein the parameter calculator is configured to:
linearly interpolate first to third saturation parameters of the first hue axis, which are set for each of the first to third saturation control areas to correspond to the first hue axis of the first control area, and first to third saturation parameters of the second hue axis, which are set for each of the first to third saturation control areas to correspond to the second hue axis of the first control area, using the calculated hue angle and calculate the first to third saturation gains; and
linearly interpolate first and second hue parameters of the first hue axis, which are set for each of the first and second hue control areas of the first control area, and first and second hue parameters of the second hue axis, which are set for each of the first and second hue control areas of the first control area, using the calculated hue angle and calculate the first and second hue gains.

5. The color gamut mapping method of claim 3, wherein:
the controlling, by the saturation controller, of the saturation of the first chrominance components includes controlling the saturation of the first chrominance components by applying at least one of the first to third saturation gains corresponding to the first to third saturation control areas to the first chrominance components according to a result of comparing a saturation value of the first chrominance components to the first to third saturation control points; and
the controlling, by the hue controller, of the hue of the second chrominance components includes controlling the hue of the second chrominance components by applying any one of the first and second hue gains corresponding to the first and second hue control areas to the second chrominance components according to a result of comparing a saturation value of the second chrominance components to the hue control point.

6. The color gamut mapping method of claim 5, wherein the controlling, by the saturation controller, of the saturation of the first chrominance components includes:
when the saturation value of the first chrominance components is less than or equal to a first saturation control point, controlling the saturation of the first chrominance components by applying the first saturation gain to the first chrominance components;
when the saturation value of the first chrominance components is greater than the first saturation control point and is less than or equal to the second saturation control point, controlling the saturation of the first chrominance components by dividing the saturation value of the first chrominance components into a first saturation value and a second saturation value to respectively correspond to the first saturation control area and the second saturation control area using the first saturation control point and summing a value obtained by applying the first saturation gain to the first saturation value and a value obtained by applying the second saturation gain to the second saturation value; or
when the saturation value of the first chrominance components is greater than the second saturation control point, controlling the saturation of the first chrominance components by dividing the saturation value of the first chrominance components into a first saturation value, a second saturation value, and a third saturation value to respectively correspond to the first saturation control area, the second saturation control area, and the third saturation control area using the first and second saturation control points and summing all of a value obtained by applying the first saturation gain to the first saturation value, a value obtained by applying the second saturation gain to the second saturation value, and a value obtained by applying the third saturation gain to the third saturation value.

7. The color gamut mapping method of claim 5, wherein the controlling, by the hue controller, of the hue of the second chrominance components includes:
when the saturation value of the second chrominance components is less than or equal to the hue control point, controlling the hue of the second chrominance components by applying the first saturation gain to the second chrominance components; or
when the saturation value of the second chrominance components is greater than the hue control point, controlling the hue of the second chrominance components by applying the second saturation gain to the second chrominance components.

8. The color gamut mapping method of claim 1, wherein the supplementally controlling, by the overall controller, of the saturation and the hue of the third chrominance components includes:
supplementally controlling, by the overall controller, the saturation of the third chrominance components by applying the overall saturation gain to the third chrominance components; and
supplementally controlling, by the overall controller, the hue of the controlled third chrominance components by applying the overall hue gain to the controlled third chrominance components.

9. A color gamut mapping device comprising:
a color space converter configured to convert first color signals of an input image into a first luminance component and a pair of first chrominance components and output the first luminance component and the pair of first chrominance components, the first color signals including a first red signal, a first green signal, and a first blue signal;
a hue calculator configured to calculate and output a hue angle using the first chrominance components;
a hue axis selection unit configured to select and output a first hue axis and a second hue axis of a first control area in which the calculated hue angle is located among a plurality of control areas divided by a plurality of hue axes having different hue angles;
a parameter calculator configured to calculate and output a plurality of parameters including a plurality of saturation gains and a plurality of hue gains using a plurality of parameters that are set to correspond to the selected first and second hue axes and using the calculated hue angle;
a saturation controller configured to control a saturation of the first chrominance components for the first control area by applying at least one of the calculated saturation gains to the first chrominance components and output second chrominance components;
a hue controller configured to control a hue of the second chrominance components for the first control area by applying any one of the calculated hue gains to the second chrominance components and output third chrominance components;
an overall controller configured to supplementally control a saturation and a hue of the third chrominance components using overall saturation gain and overall hue gain and output fourth chrominance components; and
a color space inverse converter configured to inversely convert the fourth chrominance components and the first luminance component into second color signals and output the second color signals, the second color signals including a second red signal, a second green signal, and a second blue signal.

10. The color gamut mapping device of claim 9, wherein the parameter calculator is configured to:
calculate the plurality of saturation gains corresponding to a plurality of saturation control areas that are divided by a plurality of saturation control points having different saturation values in the first control area; and
calculate the plurality of hue gains corresponding to a plurality of hue control areas that are divided by a saturation value of a hue control point in the first control area.

11. The color gamut mapping device of claim 10, wherein:
the plurality of saturation gains include a first saturation gain, a second saturation gain, and a third saturation gain that are calculated to respectively correspond to a first saturation control area, a second saturation control area, and a third saturation control area of the first control area divided by first and second saturation control points; and
the parameter calculator linearly interpolates first to third saturation parameters of the first hue axis, which are set for each of the first to third saturation control areas of the first control area, and first to third saturation parameters of the second hue axis, which are set for each of the first to third saturation control areas of the first control area, using the calculated hue angle and calculates the first to third saturation gains.

12. The color gamut mapping device of claim 10, wherein:
the plurality of hue gains include a first hue gain and a second hue gain that are calculated to respectively correspond to a first hue control area and a second hue control area of the first control area divided by the hue control point; and
the parameter calculator linearly interpolates first and second hue parameters of the first hue axis, which are set for each of the first and second hue control areas to correspond to the first hue axis of the first control area, and first and second hue parameters of the second hue axis, which are set for each of the first and second hue control areas to correspond to the second hue axis of the first control area, using the calculated hue angle and calculates the first and second hue gains.

13. The color gamut mapping device of claim 11, wherein:
the saturation controller controls the saturation of the first chrominance components by applying at least one of the first to third saturation gains corresponding to the first to third saturation control areas to the first chrominance components according to a result of comparing a saturation value of the first chrominance components to the first to third saturation control points; and
the hue controller controls the hue of the second chrominance components by applying any one of the first and second hue gains corresponding to the first and second hue control areas to the second chrominance components according to a result of comparing a saturation value of the second chrominance components to the hue control point.

14. The color gamut mapping device of claim 13, wherein the saturation controller is configured to:
- when the saturation value of the first chrominance components is less than or equal to the first saturation control point, control the saturation of the first chrominance components by applying the first saturation gain to the first chrominance components;
- when the saturation value of the first chrominance components is greater than the first saturation control point and is less than or equal to the second saturation control point, control the saturation of the first chrominance components by dividing the saturation value of the first chrominance components into a first saturation value and a second saturation value to respectively correspond to the first saturation control area and the second saturation control area using the first saturation control point and summing a value obtained by applying the first saturation gain to the first saturation value and a value obtained by applying the second saturation gain to the second saturation value; or
- when the saturation value of the first chrominance components is greater than the second saturation control point, control the saturation of the first chrominance components by dividing the saturation value of the first chrominance components into a first saturation value, a second saturation value, and a third saturation value to respectively correspond to the first saturation control area, the second saturation control area, and the third saturation control area using the first and second saturation control points and summing all of a value obtained by applying the first saturation gain to the first saturation value, a value obtained by applying the second saturation gain to the second saturation value, and a value obtained by applying the third saturation gain to the third saturation value.

15. The color gamut mapping device of claim 13, wherein the hue controller is configured to:
- when the saturation value of the second chrominance components is less than or equal to the hue control point, control the hue of the second chrominance components by applying the first hue gain to the second chrominance components; or
- when the saturation value of the second chrominance components is greater than the hue control point, control the hue of the second chrominance components by applying the second hue gain to the second chrominance components.

16. The color gamut mapping device of claim 9, wherein the overall controller is configured to:
- supplementally control the saturation of the third chrominance components by applying the overall saturation gain to the third chrominance components; and
- supplementally control the hue of the controlled third chrominance component by applying the overall hue gain to the controlled third chrominance components.

* * * * *